(12) United States Patent
Weisglass et al.

(10) Patent No.: US 11,513,188 B2
(45) Date of Patent: Nov. 29, 2022

(54) DETECTION AND PREVENTION OF A CYBER PHYSICAL ATTACK AIMED AT SENSORS

(71) Applicant: Red Bend Ltd., Hod Hasharon (IL)

(72) Inventors: Yuval Weisglass, Kfar-Saba (IL); Yoram Oren, Hod HaSharon (IL); Tomer Gilad, Tel-Mond (IL); David Mor Ofek, Nes Harim (IL)

(73) Assignee: Red Bend Ltd., Hod Hasharon (IL)

( * ) Notice: Subject to any disclaimer, the term of this patent is extended or adjusted under 35 U.S.C. 154(b) by 323 days.

(21) Appl. No.: 16/652,974

(22) PCT Filed: Oct. 2, 2017

(86) PCT No.: PCT/IL2017/051118
§ 371 (c)(1),
(2) Date: Apr. 1, 2020

(87) PCT Pub. No.: WO2019/069300
PCT Pub. Date: Apr. 11, 2019

(65) Prior Publication Data
US 2020/0326409 A1    Oct. 15, 2020

(51) Int. Cl.
*G01S 7/36*     (2006.01)
*G01S 17/931*   (2020.01)
(Continued)

(52) U.S. Cl.
CPC .............. *G01S 7/36* (2013.01); *G01S 7/0232* (2021.05); *G01S 7/0233* (2021.05);
(Continued)

(58) Field of Classification Search
CPC . G06F 7/40; G01S 7/36; G01S 13/931; G01S 15/931; G01S 17/931
See application file for complete search history.

(56) References Cited

U.S. PATENT DOCUMENTS 5,892,477 A * 4/1999 Wehling ................... G01S 7/36
                                                             342/18
8,705,527 B1 * 4/2014 Addepalli ............. H04W 12/03
                                                             370/389
(Continued)

FOREIGN PATENT DOCUMENTS

EP      1775600 A1     4/2007
WO   2019069300 A1     4/2019

OTHER PUBLICATIONS

Petit, J. et al., "Remote Attacks on Automated Vehicles Sensors: Experiments on Camera and LiDAR," Black Hat Website, Available Online at https://www.blackhat.com/docs/eu-15/materials/eu-15-Petit-Self-Driving-And-Connected-Cars-Fooling-Sensors-And-Tracking-Drivers-wp1.pdf, Nov. 30, 2015, 13 pages.
(Continued)

*Primary Examiner* — Peter M Bythrow
(74) *Attorney, Agent, or Firm* — McCoy Russell LLP (57) ABSTRACT

A method for processing signals of active sensor systems including processing an emitted signal to include at least one distinguishing feature, the emitted signal emitted by an active sensor system adapted to intercept a reflection of the emitted signal, and to analyze the reflection of the emitted signal for determining at least one parameter of at least one object located in a space, analyzing an intercepted portion to verify the at least one distinguishing feature in the intercepted portion, and processing the intercepted portion as the reflection of the emitted signal when the at least one distinguishing feature is verified.

18 Claims, 2 Drawing Sheets

(51) Int. Cl.
  *G01S 7/495*   (2006.01)
  *G01S 7/537*   (2006.01)
  *G01S 13/931*  (2020.01)
  *G01S 15/89*   (2006.01)
  *G01S 15/931*  (2020.01)
  *G01S 7/02*    (2006.01)

(52) U.S. Cl.
  CPC ............ *G01S 7/0234* (2021.05); *G01S 7/495* (2013.01); *G01S 7/537* (2013.01); *G01S 13/931* (2013.01); *G01S 15/89* (2013.01); *G01S 15/931* (2013.01); *G01S 17/931* (2020.01); *G01S 7/023* (2013.01); *G01S 2013/93277* (2020.01)

(56) References Cited

U.S. PATENT DOCUMENTS

| | | | | |
|---|---|---|---|---|
| 9,117,069 | B2* | 8/2015 | Oliphant | H04L 63/1433 |
| 9,525,700 | B1* | 12/2016 | Malinowski | H04L 63/145 |
| 9,813,436 | B2* | 11/2017 | Moeller | H04L 67/12 |
| 10,604,112 | B2* | 3/2020 | Matsumoto | G07C 9/00309 |
| 2004/0000986 | A1* | 1/2004 | Ott | G01S 13/84 |
| | | | | 340/541 |
| 2005/0190619 | A1* | 9/2005 | Wakiyama | G11C 7/24 |
| | | | | 365/201 |
| 2011/0213968 | A1* | 9/2011 | Zhang | H04L 67/12 |
| | | | | 713/158 |
| 2012/0081544 | A1 | 4/2012 | Wee | |
| 2013/0127618 | A1* | 5/2013 | Sheleheda | H04L 41/0631 |
| | | | | 340/540 |
| 2013/0212659 | A1* | 8/2013 | Maher | G05D 1/0022 |
| | | | | 726/6 |
| 2014/0096251 | A1* | 4/2014 | Doctor | H04L 63/1441 |
| | | | | 726/23 |
| 2014/0247122 | A1* | 9/2014 | Moeller | G06F 21/554 |
| | | | | 340/426.25 |
| 2015/0066239 | A1* | 3/2015 | Mabuchi | H04L 63/1425 |
| | | | | 701/1 |
| 2015/0113638 | A1* | 4/2015 | Valasek | G06F 21/562 |
| | | | | 726/22 |
| 2015/0271201 | A1* | 9/2015 | Ruvio | H04L 63/1408 |
| | | | | 726/23 |
| 2016/0197944 | A1* | 7/2016 | Allouche | H04L 63/1416 |
| | | | | 726/23 |
| 2018/0130168 | A1* | 5/2018 | Nayshtut | H04L 9/3278 |

OTHER PUBLICATIONS

ISA Israel Patent Office, International Search Report and Written Opinion Issued in Application No. PCT/IL2017/051118, dated Dec. 31, 2017, WIPO, 10 pages.

European Patent Office, Extended European Search Report Issued in Application No. 17927846.0, dated Mar. 24, 2021, Germany, 9 pages.

International Bureau of WIPO, International Preliminary Report on Patentability Issued in Application No. PCT/IL2017/051118, dated Sep. 16, 2019, WIPO, 8 pages.

* cited by examiner

DETECTION AND PREVENTION OF A CYBER PHYSICAL ATTACK AIMED AT SENSORS

CROSS-REFERENCE TO RELATED APPLICATIONS

The present application is a U.S. National Phase of International Patent Application Serial No. PCT/IL2017/051118 entitled "DETECTION AND PREVENTION OF A CYBER PHYSICAL ATTACK AIMED AT SENSORS," filed on Oct. 2, 2017. The entire contents of the above-referenced application is hereby incorporated by reference for all purposes.

TECHNICAL FIELD

The description relates to electromagnetic attack detection and/or prevention and, more specifically, but not exclusively, to detection and prevention of an attack aimed at an active sensor system, such as a system that includes a source that emits signals and a sensor intercepts reflections thereof from the physical surrounding.

BACKGROUND

Active sensor systems include sensors for remote sensing is in demand in civil application field such as city, forestry, ecology, vegetation, disaster assessment, emergency response and topographic mapping. A mobile remote sensing system has the advantages of small size, light weight, low cost, low loss, reusability and low risk, with its applicable scope expanding from military field to non-military field. Unmanned remote sensing has high real-time and high resolution features so that it has become more and more popular among researchers and manufacturers. Making the applicable domain and user group in remote sensing expand, unmanned remote sensing has broad application prospect.

Providing active sensor systems with high integrity requires overcoming possible security breaches.

SUMMARY

According to the description, there is provided a method for processing signals of active sensor systems, comprising: processing a signal to include at least one distinguishing feature, the signal emitted by an active sensor system adapted to intercept at least a portion of the emitted signal or at least a portion of a reflection of the emitted signal and to analyze the portion for determining at least one parameter of at least one object located in a space, analyzing at least the intercepted portion to verify the at least one distinguishing feature in at least the intercepted portion, and processing the reflection of the emitted signal as a verified signal only when the at least one distinguishing feature is verified.

Optionally, the method further comprises classifying the signal as an unverified signal when the distinguishing feature is unverified with reference to the intercepted signal.

Optionally, the method further comprises generating a notification indicative of a trial to temper signals emitted from the active sensor system and/or to deceive a system that uses the active sensor system when the signal is classified as an unverified signal response.

Optionally, the active sensor system is selected from a group consisting of a radio detection and ranging (RADAR) and a Light Detection and Ranging (LiDAR) unit, an Ultrasonic imaging device, and a medical imaging modality.

Optionally, the analyzing and the processing of the intercepted portion are executed by an electric control unit (ECU) physically separated from the active sensor system; wherein the method further comprises forwarding the intercepted portion to the ECU from the active sensor intercepted.

Optionally, the distinguishing feature is a random number or a digital signature.

Optionally, the processing of an emitted signal comprises modulating the emitted signal; wherein the processing of the intercepted portion comprises demodulating the intercepted portion.

More optionally, the modulating is performed according to a dynamic modulation code and the demodulating is performed using the dynamic modulation code.

More optionally, the modulating is performed according to a dynamic pulse-time modulation and the demodulating is performed using the dynamic pulse-time modulation.

More optionally, the modulating is performed according to a dynamic frequency modulation and the demodulating is performed using the dynamic frequency modulation.

Optionally, the distinguishing feature is iteratively updated based on at least one of a passing time period and a number of transmission sessions conducted by the active sensor system.

Optionally, the distinguishing feature is stored in a memory accessed by a decoder or a demodulator that performs the processing of the intercepted portion accordingly.

Optionally, the distinguishing feature is forwarded over a communication channel to a decoder or a demodulator that performs the processing of the intercepted portion accordingly.

Optionally, the method further comprises when the at least one distinguishing feature is not verified, processing the intercepted portion for performing an action selected from blocking the reflection, jamming the reflection, delaying the reflection and/or interfering with the reflection.

More optionally, the processing is adapted according to at least one parameter extracted from the intercepted portion.

Optionally, the emitted signal is emitted by headlights of a vehicle; wherein said active sensor system comprises at least one sensor for intercepting said reflection.

According to the description, there is provided a monitoring device for processing signals of active sensor systems to prevent emulating or tempering reflections of the signals by a malicious entity. The device comprises an encoder or a modulator adapted to process a signal emitted by an active sensor system to include at least one distinguishing feature, the active sensor system comprises a receiver for intercepting at least a portion of the emitted signal or of a reflection of the emitted signal so as to allow analyzing the reflection for determining at least one parameter of at least one object located in a space, a decoder or a demodulator adapted to decode or demodulate at least the intercepted portion, and at least one processor adapted to verify the at least one distinguishing feature in the decoded or demodulated signal and to instruct processing the reflection of the emitted signal as a verified signal only when the at least one distinguishing feature is verified.

Optionally, the at least one processor is adapted to classify the signal as an unverified signal when the at least one distinguishing feature is unverified with reference to the signal.

Optionally, the encoder or a modulator is electronically connected to the active sensor system and the decoder or demodulator is electronically connected to an electric control unit (ECU) processor physically separated from the active sensor system.

Unless otherwise defined, all technical and/or scientific terms used herein have the same meaning as commonly understood by one of ordinary skill in the art to which the description pertains. Although methods and materials similar or equivalent to those described herein can be used in the practice or testing of embodiments of the description, exemplary methods and/or materials are described below. In case of conflict, the patent specification, including definitions, will control. In addition, the materials, methods, and examples are illustrative only and are not intended to be necessarily limiting.

BRIEF DESCRIPTION OF THE FIGURES

Some embodiments of the teaching are herein described, by way of example only, with reference to the accompanying drawings. With specific reference now to the drawings in detail, it is stressed that the particulars shown are by way of example and for purposes of illustrative discussion of embodiments of the description. In this regard, the description taken with the drawings makes apparent to those skilled in the art how embodiments of the description may be practiced.

In the drawings.

DETAILED DESCRIPTION

The description relates to electromagnetic attack detection and/or prevention and, more specifically, but not exclusively, to detection and prevention of an attack aimed at an active sensor system, such as a sensor that emits signals and intercepts reflections thereof from the physical surrounding. The active sensor system may include a radio detection and ranging (RADAR) and a Light Detection and Ranging (LiDAR) unit, an x-ray imaging unit, an ultrasound unit, a sonar unit, and/or any detection system that is based on emitting radiation (e.g. light radiation, infrared radiation, radiofrequency (RF) radiation, and microwave radiation) and intercepting the reflection of such. The active sensor system may include vehicle front, rear and/or surround cameras and optionally a light source such as headlights, for example as described below.

Conventional security systems, such as automotive security systems, aim to protect the communication in a vehicle, for instance between computational nodes and/or between the vehicle and external systems by evaluating data transmitted on communication channels including sensor output data. Such systems do not allow detecting and/or preventing electromagnetic attack designed to disrupt electromagnetic radiation (EMR) interception by active sensor systems. Usually, only sensor data messages which are generated by the active sensor system may be authenticated, for instance to indicate an eligible origin and/or that the data messages have not been altered or replaced and essentially the integrity of the sensor's readings is not verified and hence an attack vector designating the sensor's readings is not handled.

Some embodiments of the description are designed to detect and/or prevent active attacks where an attacker interferes with physical signals received by the active sensor system which in turn transmits spoofed (e.g. tempered) or altered information as legitimate messages. Such attacks may have fatal consequences on any control system which depends on data collected from sensors to decide the next actions to be taken. Of course, preventing such attacks increases the integrity of sensor data in autonomous driving systems which use active sensor systems and also increases the integrity of sensor data in other systems, such as medical systems, drones, industrial control systems and/or any system that automates functions or presents information based on an analysis of sensor data from active sensor systems.

According to embodiments of the description, there is provided a monitoring device that adds distinguishing features to signals emitted by an active sensor system and probes signals intercepted by a sensor of the active sensor system so as to detect the presence or absence of the distinguishing features and to determine whether to process the intercepted signals as reflections of the emitted signals or as unverified signals. These embodiments allow an increase in the integrity of the active sensor system by authenticating signals as non-tampered reflections originating from the active sensor system. A distinguishing feature is added to the emitted signals by modulating the emitted signals according to a modulation scheme, encoding a code in the emitted signals and/or encoding the emitted signals according to a code, optionally dynamic and unique. This is achieved by being able to prove mathematically that the received signal is indeed authentic and untampered with when the signal is reflected back.

Before explaining at least one embodiment of the description in detail, it is to be understood that the description is not necessarily limited in its application to the details of construction and the arrangement of the components and/or methods set forth in the following description and/or illustrated in the drawings and/or the Examples. The description is capable of other embodiments or of being practiced or carried out in various ways.

The description may be a system, a method, and/or a computer program product. The computer program product may include a computer readable storage medium (or media) having computer readable program instructions thereon for causing a processor to carry out aspects of the description.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the description may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the description.

Aspects of the description are described herein with reference to flowchart illustrations and/or block diagrams of methods, apparatus (systems), and computer program products according to embodiments of the description. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the description. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 1:
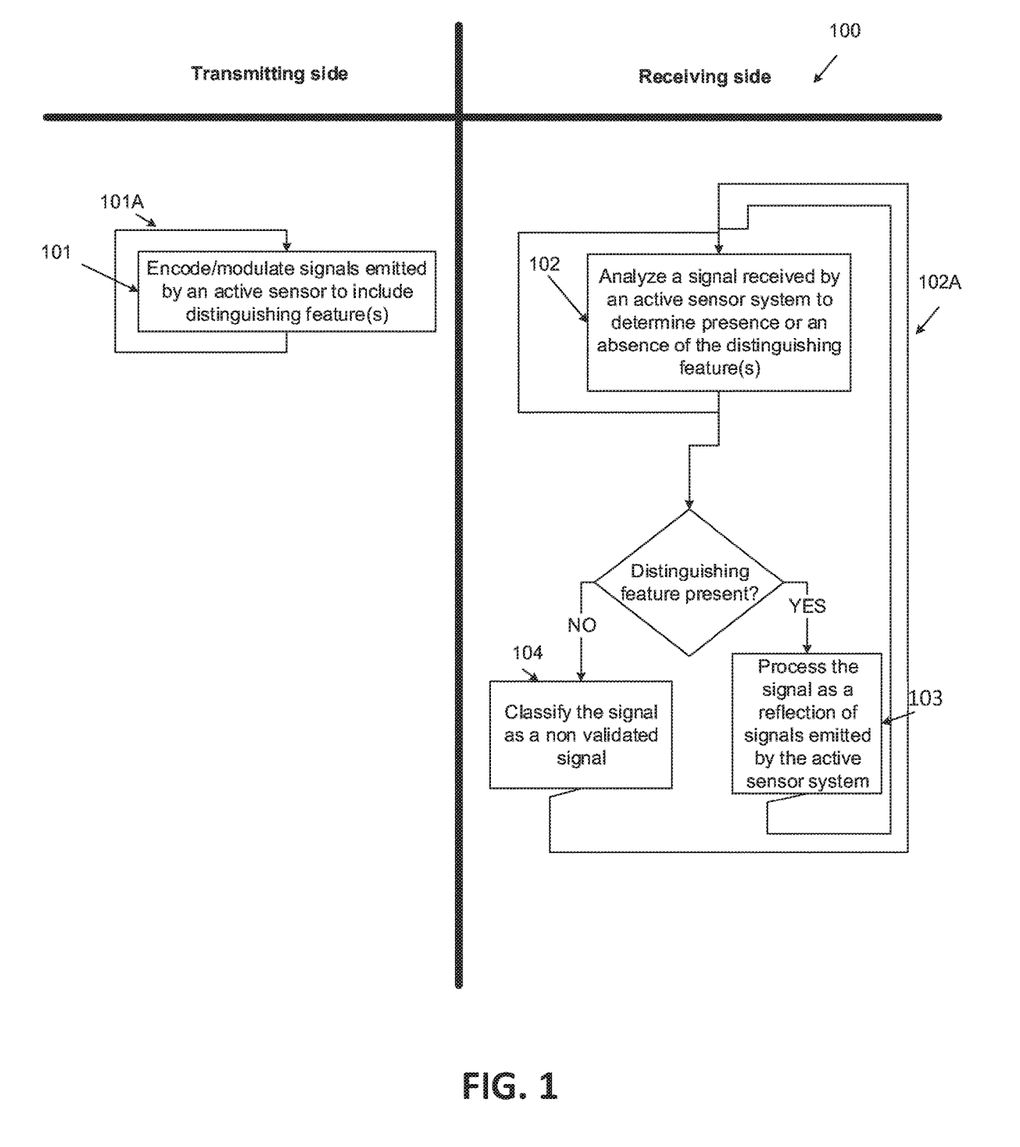
FIG. 1 is a flowchart of a method for processing signals intercepted by an active sensor system based on the presence or absence of a distinguishing feature modulated in the signals, according to some embodiment of the description.

Reference is now made to FIG. 1 which is a flowchart of a method 100 for processing signals intercepted by a sensor of an active sensor system, such as a RADAR, an image sensor, and a LiDAR unit, based on the presence or absence of a distinguishing feature modulated in the signals, according to some embodiment of the description. The distinguishing feature may be a unique identifier such as a random number, a digital signature, and/or a modulation, optionally unique, of the signal or a portion thereof, for instance based on frequency modulation (e.g. including frequency hopping and/or scrambling indication), code modulation and/or time-phase modulation. The method 100 is based on adding the distinguishing feature to signals emitted by a sensor of the active sensor system such that the distinguishing feature is expected to be in reflections of these signals, namely in valid signals which are captured by the active sensor system, and not in signals which are originated from another source, for instance an untrusted source or interferences.

The method includes a transmitting side and a receiving side. Optionally, both sides are implemented as an integral component of the active sensor system and/or a component connected to the active sensor system, for instance as an integrated circuit having one or more processors and a memory, optionally with encoders and decoders and/or modulators and/or demodulators as described below. Alternatively, while the transmitting side is implemented as an integral component of the active sensor system and/or a component connected to the active sensor system, the receiving side may be partly or fully implemented in a system that receives outputs of the sensors, for instance as an integral component of the active sensor system and/or a component connected to the system. The system may be an autonomous driving system of a vehicle and/or any other system that uses active sensor systems such as a security system or a medical system. Optionally, the active sensor system includes one or more image sensors as a receiving side and a light emitting source, such as headlights of the vehicle and/or infrared (IR) emitting source and/or any light pattern emitting source.

Figure 2:
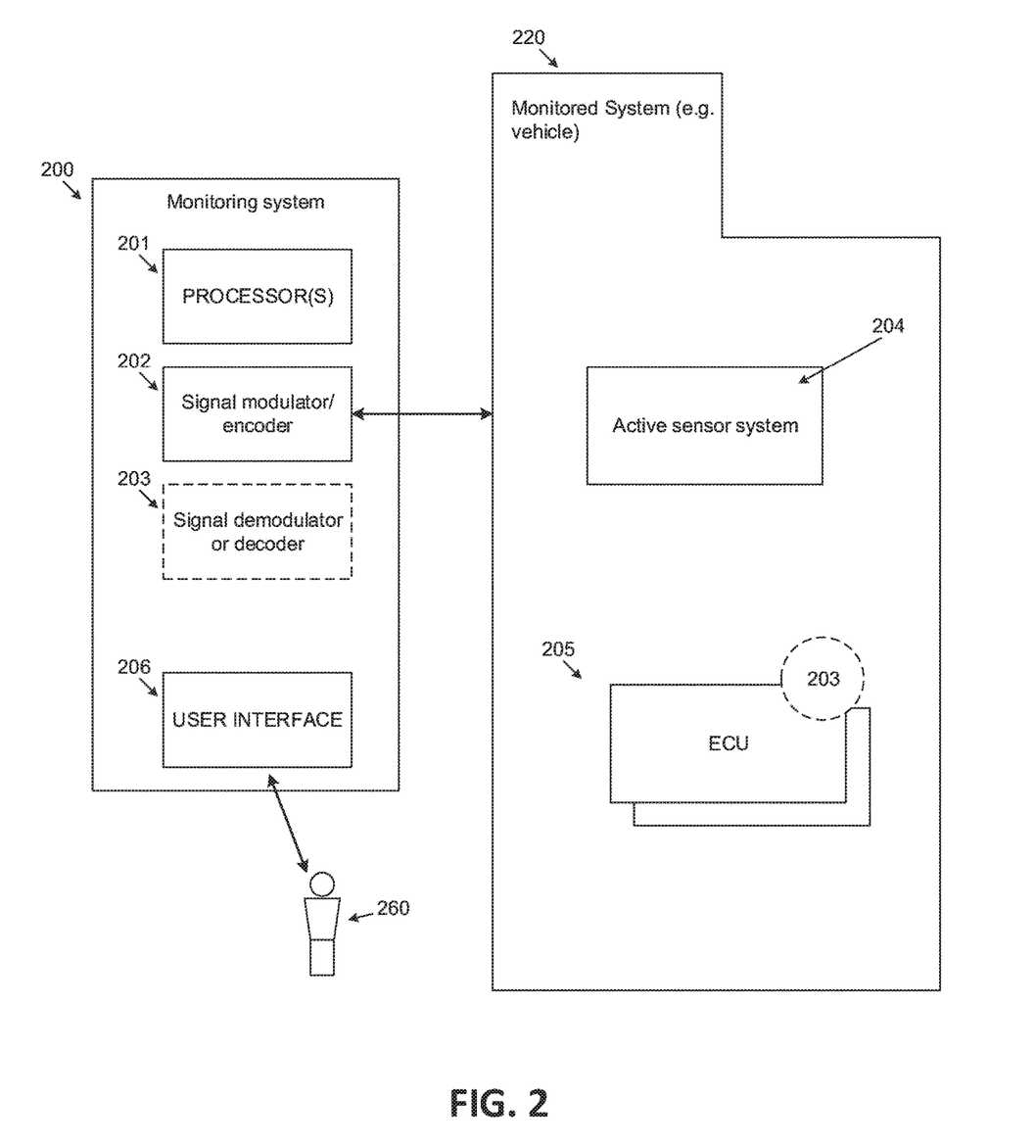
FIG. 2 is a schematic illustration of a monitoring device for processing signals intercepted by an active sensor system, for instance a system implementing the method of FIG. 1, according to some embodiments of the description.

Reference is also made to FIG. 2 which is a schematic illustration of a monitoring device 200 for processing signals intercepted by an active sensor system, for instance a system implementing the method of FIG. 1, according to some embodiments of the description. The monitoring device 200 optionally comprises a processor 201, a signal modulator or encoder 202, and a signal demodulator or decoder 203. The monitoring device 200 may be implemented as an integrated circuit electrically connected and/or integrated into an active sensor 204 and/or divided between the active sensor 204 and an electric control unit (ECU) 205 of a monitored system 220 or any processing unit of the monitored system 220 that receives an output from the active sensor system 204. For example, while the processor 201 and the signal modulator or encoder 202 may be integrated into the active sensor system 204 the signal demodulator or decoder 203 may be integrated or connected to one or more processing units which are consumers of outputs of the active sensor system 204. The active sensor system 204 is connected to the monitored system 220 that receives sensor output therefrom for detecting the presence of object(s) at a distance, detecting the speed of the object(s) and/or mapping objects in a target environment, for example to create detailed topographic maps of surrounding surfaces. For example, the system may be an autonomous driving system, a medical system such as an imaging modality and/or a security system using an active sensor system for protecting an area and/or a target object.

Optionally, the distinguishing feature is a dynamic distinguishing feature that changes over time and/or every one or more transmission sessions so as to prevent a malicious entity copying it for emulating reflections of the active sensor system 204, for example as described below. As used herein, a session or a transmission session means one or more events during which the transmitting unit of the active sensor system emits and optionally intercepts signals for detecting objects or parameters thereof, for instance signals transmitted and intercepted in a time frame of 1, 5, 10 or any intermediate or longer period.

In use, as shown at 101, some or all of the signals emitted from the active sensor system are decoded or modulated, for instance by the signal modulator or encoder 202, to include one or more distinguishing feature(s). As shown at 101A, this process may be performed continuously or iteratively, for each signal emitted from a radiation source of the active sensor system and/or for some of the signals emitted from the radiation source of the active sensor system.

The active sensor system 204 is adapted to intercept the emitted signals and/or reflections of the emitted signals and to analyze them for determining parameter(s) of object(s) located in a space, for example distance, velocity, and/or shape. For example, the signals are electromagnetic energy such as RF or light pulses sent out from the active sensor system, optionally in short bursts, through an antenna or any other emitter. The pulses may be transmitted in a narrow beam.

The distinguishing feature(s) are optionally dynamically adapted, for example changed over time and/or every number of transmission sessions. The distinguishing feature(s) are optionally stored and/or forwarded to the signal demodulator or decoder 203 for facilitating the usage thereof in decoding and/or demodulation of intercepted signals. For example, the distinguishing feature(s) may be stored in a shared storage that may be accessed by the demodulator or decoder 203 and/or forwarded to the demodulator or decoder 203 over communication channels. The distinguishing feature(s) are optionally time stamped to allow the demodulator or decoder 203 to select suitable value for the decoding and/or modulation.

When an encoder is used, a random number generator or a digital signature generator may be used for selecting a code encoded into the signals and/or used for encoding the signal as a whole or any portion thereof.

When a modulator is used, a dynamic modulation code may be selected for modulating the signal or any portion thereof accordingly. Additionally or alternatively, dynamic pulse-time modulation may be selected for modulating the signal or any portion thereof accordingly. Additionally or alternatively, dynamic frequency modulation may be selected for modulating the signal or any portion thereof accordingly. The dynamic modulation code, the dynamic pulse-time modulation, and/or the dynamic frequency modulation may be stored and/or forwarded as described above to facilitate the demodulation of intercepted signals accordingly.

As indicated above, the modulated or encoded signals may be originated from various radiation sources, including RF transmitters, light emitters such as headlights, LiDAR, RADAR and/or the like. Additionally or alternatively, modulation is achieved according to a mechanical movement of the car for example, by recording the mechanical movement and/or using existing knowledge of car movement Reference is now made to 102-104. As shown by 102A these processes are performed continuously or iteratively, for each signal intercepted by the active sensor system and/or for some of the signals intercepted by the active sensor system. The process in 102-104 may be held for all intercepted signals or some of the intercepted signals, for example continuously or interchangeably.

As shown at 102, a signal intercepted by the active sensor system is analyzed to determine a presence and/or an absence of a distinguishing feature therein. The intercepted signal may be a portion of the emitted signal or a portion of the reflection of the emitted signal. As used herein, determine and verify may be referred to herein interchangeably. For example, a code used for modulation and/or coding of the emitted signals is used for demodulation and/or decoding of the intercepted signals, facilitating a determination of whether the intercepted signals have been processed using the code. The decoding or demodulating is optionally performed by the demodulator or decoder 203 and the analysis is optionally performed using the processor 201.

As outlined above, the analysis may be performed by a signal demodulator or a decoder 203 which may be implemented as an integrated circuit electrically connected and/or integrated into the active sensor system 204 and/or installed in an electric control unit (ECU) 205 or any processing unit that receives output(s) from the active sensor system 204.

When some or all of the signals intercepted by the active sensor system are analyzed by a decoder, a code stored in the memory and/or forwarded to the decoder is used for the decoding. For example, a random number stored in the memory may be used in a decoding function to decode a signal. Additionally or alternatively, the random number and/or a digital signature may be searched for in the intercepted signal.

When the signals intercepted by the active sensor system are analyzed by a signal demodulator 203, a modulation code or value (e.g. indicative of a frequency modulation and/or time modulation) stored in the memory and/or forwarded to the demodulator is used for the signal demodulation. For example, a value stored in the memory may be used for determining based on which frequency or binning frame to demodulate an intercepted signal. As indicated above, the code or value used for demodulation or decoding is selected based on a time tag and/or based on a current time such that the code or value used for modulation or coding of signals emitted in a certain session or time frame is the one used for demodulation or decoding held during the respective certain session or the respective time frame.

As shown at 103, the intercepted signal is processed as a reflection of the emitted signals when a presence of the distinguishing feature is identified therein. This allows for reducing the chances that the intercepted signals which are processed by the active sensor system and/or forwarded to a system receiving outputs from the active sensor system are tampered with or originated from a source which is not the active sensor system. For example, the signals are forwarded to be processed as outputs of the active sensor system and/or as reflections which are processed by the active sensor system. Additionally or alternatively signals are classified as valid or verified signals.

As shown at 104, the signals are classified as unverified signals when an absence of the distinguishing feature is identified in the intercepted signals, for example in at least a portion of the emitted signals and/or in at least a portion of a reflection thereof. This allows ignoring or blocking signals which are not verified as reflections of the emitted signals and/or generating a notification indicative of a trial to temper signals emitted from the active sensor system and/or to deceive a system that uses the active sensor system by transmitting signals which are not originated from the active sensor system. On the other hand this allows processing only unignored or unblocked signals, namely signals which are verified as reflections of the emitted signals and/or generating a notification indicative of verified signals emitted from the active sensor system.

This increases the chances that a trial to attack a system receiving outputs of the active sensor system is detected and handled before the integrity of the system is compromised. Additionally or alternatively, signals which are not verified as reflections of the emitted signals may be actively manipulated for instance delayed, jammed and/or selectively interfered with. Such active manipulation as delaying, jamming and/or selectively interfering with may be performed by parameters of the unverified signals, for instance parameters determined based on analog or digital signal analysis.

Optionally, a user interface 206 is used to present a notification indicative of a presence of unverified signals to a user 260, such as a user of a vehicle having an autonomous or a semi-autonomous driving support system, such as the system 220. Additionally or alternatively, protection processes and/or functions are activated in response to the detection of the unverified signals. Additionally or alternatively, unverified signals are documented and forwarded to an analysis and/or presentation at a central monitoring site.

The methods as described above are used in the fabrication of integrated circuit chips.

The descriptions of the various embodiments of the description have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

It is expected that during the life of a patent maturing from this application many relevant methods and systems will be developed and the scope of the term a processor, an active sensor system, coding and modulation is intended to include all such new technologies a priori.

As used herein the term "about" refers to ±10%.

The terms "comprises", "comprising", "includes", "including", "having" and their conjugates mean "including but not limited to". This term encompasses the terms "consisting of" and "consisting essentially of".

The phrase "consisting essentially of" means that the composition or method may include additional ingredients and/or steps, but only if the additional ingredients and/or steps do not materially alter the basic and novel characteristics of the claimed composition or method.

As used herein, the singular form "a", "an" and "the" include plural references unless the context clearly dictates otherwise. For example, the term "a compound" or "at least one compound" may include a plurality of compounds, including mixtures thereof.

The word "exemplary" is used herein to mean "serving as an example, instance or illustration". Any embodiment described as "exemplary" is not necessarily to be construed as preferred or advantageous over other embodiments and/or to exclude the incorporation of features from other embodiments.

The word "optionally" is used herein to mean "is provided in some embodiments and not provided in other embodiments". Any particular embodiment of the description may include a plurality of "optional" features unless such features conflict.

Throughout this application, various embodiments of this description may be presented in a range format. It should be understood that the description in range format is merely for convenience and brevity and should not be construed as an inflexible limitation on the scope of the description. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

Whenever a numerical range is indicated herein, it is meant to include any cited numeral (fractional or integral) within the indicated range. The phrases "ranging/ranges between" a first indicate number and a second indicate number and "ranging/ranges from" a first indicate number "to" a second indicate number are used herein interchangeably and are meant to include the first and second indicated numbers and all the fractional and integral numerals therebetween.

It is appreciated that certain features of the description, which are, for clarity, described in the context of separate embodiments, may also be provided in combination in a single embodiment. Conversely, various features of the description, which are, for brevity, described in the context of a single embodiment, may also be provided separately or in any suitable subcombination or as suitable in any other described embodiment of the description. Certain features described in the context of various embodiments are not to be considered essential features of those embodiments, unless the embodiment is inoperative without those elements.

Although the description has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the description. To the extent that section headings are used, they should not be construed as necessarily limiting.

What is claimed is:

1. A method for processing signals of active sensor systems, comprising:
    processing a signal to include at least one distinguishing feature, wherein the signal is emitted by an active sensor system adapted to intercept at least a reflection of the emitted signal or a portion of the emitted signal and to analyze the reflection of the emitted signal for determining at least one parameter of at least one object located in a space;
    analyzing the intercepted portion to identify when the at least one distinguishing feature is present in the intercepted portion;
    classifying the intercepted portion as an unverified signal when the distinguishing feature is identified as not present in the intercepted portion; and
    as a response to identification of the presence of the at least one distinguishing feature, processing the intercepted portion as a verified signal;
    wherein the emitted signal is emitted by headlights of a vehicle; and
    wherein said active sensor system comprises at least one sensor for intercepting said reflection.

2. The method of claim 1, further comprising generating a notification indicative of a trial to temper signals emitted from the active sensor system and/or to deceive a system that uses the active sensor system when the signal is classified as an unverified signal response.

3. The method of claim 1, wherein the active sensor system is selected from a group consisting of a radio detection and ranging (RADAR) and a Light Detection and Ranging (LiDAR) unit, an Ultrasonic imaging device, and a medical imaging modality.

4. The method of claim 1, wherein the analyzing, the classifying and the processing of the intercepted portion are executed by an electric control unit (ECU) physically separated from the active sensor system; wherein the method further comprises forwarding the intercepted portion from the active sensor system to the ECU.

5. The method of claim 1, wherein the at least one distinguishing feature is a random number or a digital signature.

6. The method of claim 1, wherein the processing of an emitted signal comprises modulating the emitted signal; wherein the processing of the intercepted portion comprises demodulating the intercepted portion.

7. The method of claim 6, wherein the modulating is performed according to a dynamic modulation code and the demodulating is performed using the dynamic modulation code.

8. The method of claim 6, wherein the modulating is performed according to a dynamic pulse-time modulation and the demodulating is performed using the dynamic pulse-time modulation.

9. The method of claim 6, wherein the modulating is performed according to a dynamic frequency modulation and the demodulating is performed using the dynamic frequency modulation.

10. The method of claim 1, wherein the distinguishing feature is iteratively updated based on at least one of a passing time period and a number of transmission sessions conducted by the active sensor system.

11. The method of claim 1, wherein the distinguishing feature is stored in a memory accessed by a decoder or a demodulator that performs the processing of the intercepted portion accordingly.

12. The method of claim 1, wherein the distinguishing feature is forwarded over a communication channel to a decoder or a demodulator that performs the processing of the intercepted portion accordingly.

13. The method of claim 1, further comprising when the at least one distinguishing feature is not verified, processing the intercepted portion for performing an action selected from blocking the reflection, jamming the reflection, delaying the reflection and/or interfering with the reflection.

14. The method of claim 1, wherein the processing is adapted according to at least one parameter extracted from the intercepted portion.

15. A non-transitory computer readable medium comprising computer executable instructions adapted to perform the method of claim 1.

16. A monitoring device for processing signals of active sensor systems to prevent emulating or tempering reflections of the signals by a malicious entity, comprising:
    an encoder or a modulator adapted to process a signal emitted by an active sensor system to include at least one distinguishing feature, wherein the active sensor system comprises a receiver for intercepting at least a portion of the emitted signal or of a reflection of the emitted signal so as to allow analyzing the reflection for determining at least one parameter of at least one object located in a space;
    a decoder or a demodulator adapted to decode or demodulate at least the intercepted portion; and
    at least one processor adapted to verify the at least one distinguishing feature in the decoded or demodulated signal and to instruct processing the reflection of the emitted signal as a verified signal only when the at least one distinguishing feature is verified;
    wherein the emitted signal is emitted by headlights of a vehicle; and
    wherein said active sensor system comprises at least one sensor for intercepting said reflection.

17. The device of claim 16, wherein the at least one processor is adapted to classify the signal as an unverified signal when the at least one distinguishing feature is unverified with reference to the signal.

18. The device of claim 16, wherein the encoder or a modulator is electronically connected to the active sensor system and the decoder or demodulator is electronically connected to an electric control unit (ECU) processor physically separated from the active sensor system.

* * * * *